Jan. 30, 1968   R. P. FORSBERG ET AL   3,365,787
METHOD OF MAKING METAL HONEYCOMB SANDWICH STRUCTURE
Filed June 19, 1963
Fig. 1.
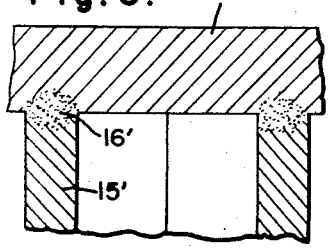
Fig. 5.
Fig. 3.
Fig. 5a.
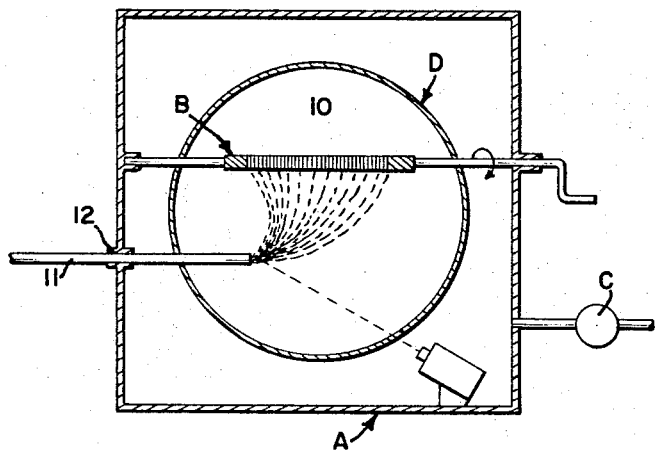
Fig. 2.
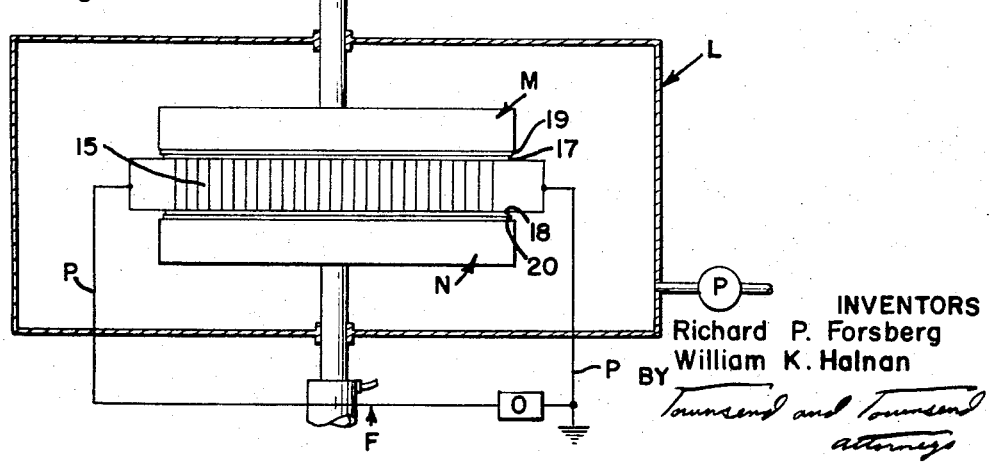
Fig. 4
INVENTORS
Richard P. Forsberg
William K. Halnan
BY Townsend and Townsend
attorneys

United States Patent Office 3,365,787
Patented Jan. 30, 1968

3,365,787
METHOD OF MAKING METAL HONEYCOMB SANDWICH STRUCTURE
Richard P. Forsberg, Berkeley, and William K. Halnan, Oakland, Calif., assignors to Hexcel Corporation, a corporation of California
Filed June 19, 1963, Ser. No. 288,949
5 Claims. (Cl. 29—471.1)

This invention relates to an improved metal honeycomb sandwich structure and to a method of making same.

In the practice of the method according to the present invention, to be described hereinafter in greater detail, we provide a section or component of metallic honeycomb core as, for example, a section of honeycomb core fabricated from metal webs or ribbons bonded at their node points to one another as by means of brazing or resistance welding or diffusion welding. Hereafter throughout the specification and claims and unless otherwise specifically limited, the term "metal" or "metallic" is intended to embrace both pure metals and metal alloys. In the preferred practice of the invention, the section of honeycomb core is made initially in unexpanded pack form as is well known in the art. The honeycomb core is only partially expanded so as to at least barely crack open the cells, in which condition a layer of interface metal which is dissimilar to the metal from which the core is made is deposited by condensation on the edges of the honeycomb core cell walls at one or both sides thereof. The layer of interface metal is condensed substantially solely on the exposed cell edge faces and with no significant amount of metal being deposited on the sides of the cells. Thereupon the honeycomb core with the condensed layer of interface material deposited thereon is fully expanded to open up the cells, and thereupon surface sheets or face skins are juxtaposed to opposite sides of the honeycomb core in contact with the interface material. The metal from which the surface sheets are made is also dissimilar to the layer of interface material and, in normal practice, would probably be of the same metal as the core material. According to one embodiment of the invention, the interface material is usually selected from a class of metals having a lesser yield strength at bonding temperatures than the metal comprising the honeycomb core component. With the surface sheets juxtaposed to the expanded honeycomb core faces, the material is subjected to heat and pressure, usually under protective atmosphere, to cause a bonding between all areas of the honeycomb cell edges with adjacent areas of the juxtaposed surface sheets.

It has been heretofore proposed to manufacture honeycomb sandwich structures from a variety of core materials for use with a variety of surface sheet materials in applications where it is desired to attain particularly high strength-to-weight ratios. Where the honeycomb sandwich structure must be maintained at relatively elevated temperatures, it has been proposed to make both the core and the surface sheets of metal and to bond the parts together by brazing, resistance welding or diffusion welding.

For example, in high speed aircraft and missile applications, where high strength-to-weight ratios need to be maintained at fairly high temperatures, such as any instance where the structural members are heated to elevated temperatures by air friction, it is conventional to employ resistance welded stainless steel honeycomb core to the opposite open faces of which are brazed stainless steel surface sheets. This type of structure has certain limitations. For example, it is apparent that in order to obtain a bond between the surface sheets and the core the brazing compound must have a substantially lower melting point (and therefore substantially lower strength properties at elevated temperatures) than either the core or surface sheet materials. Accordingly, the overall strength of the finished structure is limited to a large extent by the strength properties of the brazing material at different temperatures. A second disadvantage attendant with a brazed metallic honeycomb sandwich made in accordance with common manufacturing practice, is that the brazing compound is used in such quantities that it adds an excessive amount of weight to the structure thereby substantially decreasing the strength-to-weight ratio of the structure. More specifically, in conventional manufacture, it is common to coat the entire inner surfaces of the surface sheets with the brazing compound and these surface sheets are then superposed to opposite sides of the honeycomb core and heated under pressure to cause the brazing compound to form a filleted joint with the cell edges of the honeycomb. Thirdly, a common problem is erosion of the core metal by the brazing alloys and consequent weakening of the composite structure.

The present invention greatly minimizes or avoids the difficulties attendant in the manufacture or use of conventional brazed metal sandwich structures. In the first place, the present invention provides a layer of interface material only along the edges of the honeycomb cells where bonding is to occur. Considering that the open areas of a normal honeycomb structure account for about 97% of the total area, a great saving in the amount of interface material that has to be employed to ensure a secure bond is made possible. Secondly, although the present invention is not limited in its broader aspects to the bonding of high temperature refractory core and surface sheet metals to one another by using an interface metal which, in itself, may be of a very high temperature type, it is nevertheless feasible, by using the present invention, to make sandwich structures with refractory metals having greater strength-temperature properties than could be achieved in employing relatively low temperature melting types of brazing compounds. Refractory metal is used to refer to metals having melting points above that of chromium or above 1,890° C. This includes the metals most commonly referred to as "refractory metals," such as columbium, molybdenum, tantalum, tungsten and rhenium as well as other high melting point metals such as those in the platinum group, i.e., iradium, osmium, rhodium and ruthenium. Thirdly, the diffusion of the interface metal into the core metal may strengthen the edges of the core component which are bonded to the surface sheets by alloying and eliminating erosion.

It has also been proposed heretofore to manufacture high temperature strength-to-weight ratio sandwich structures by diffusion bonding honeycomb core and surface sheet materials together. For example, we are aware of proposals to diffusion bond stainless steel core and stainless steel skins to one another. There have also been attempts to diffusion bond directly to one another refractory metallic components such as columbium core to columbium surface sheets. In all instances of which we are aware, great care is required to secure the requisite amount of pressure and heat and proper atmosphere control to obtain a reasonable diffusion bond without also causing the honeycomb core to crush or collapse or columnarly fail. Further, in the case of certain metal alloys, as for example molybdenum, it has been found that heating of the core and surface sheets to diffusion or resistance welding temperature will adversely affect the strength properties of the metal. Further, in substantially all applications where surface sheets are directly diffusion bonded to the honeycomb core, the thickness of the core must be machined or chemically milled to extremely close tolerances to ensure uniform contact between the surface sheets and the core. Failure to obtain this uniform contact will result in localized areas in which the desired diffusion weld has not been obtained.

The present invention avoids the difficulties attendant in the manufacture of diffusion or resistance bonded honeycomb sandwich which does not utilize or incorporate an intermediate material. By provision of an interface bonding metal dissimilar to the metal of either the core or surface sheet components and provided only along the edges of the honeycomb cells where bonding is to occur, a good bond between the core and surface sheet components is achieved at temperatures and pressures below those which cause the core to collapse and which adversely affect the strength properties of the metal without materially adding to the weight of the composite structure. Under proper conditions certain interface materials can be provided in a sufficiently thin layer so that upon application of heat and pressure the interface materials will migrate into the juxtaposed sandwich components so that a substantially continuous solid solution is provided at the bonded joint without a distinct region of pure interface metal. Thus, the bonded joint will have a melting point substantially above that of the pure interface bonding material thereby providing a honeycomb sandwich structure with the most desirable strength-temperature characteristics.

The interface bonding material condensed upon the cell edge of the honeycomb core component is usually selected from a class of metals having a lower yield strength at bonding temperatures than the metal comprising the core and surface sheets. By utilization of such an interface material upon application of heat and pressure to the sandwich structure to bond the core component to the surface sheet components the interface material at raised portions of the surface defined by the cell edges will yield so that intimate contact is realized at all the core cell edge areas, the raised portions as well as the depressed portions. Accordingly, in utilization of this aspect of the invention the core component need not be fabricated to as close tolerances and this feature becomes extremely important when the sandwich core is a refractory metal which usually is difficult to machine to close tolerances.

Additionally, while the edges of the core can be coated with interface material when the core is fully expanded, according to an additional feature of the present invention the interface material is condensed onto the edges of the partially expanded honeycomb core by use of vacuum evaporation deposition in, for example, an electron beam furnace. In such a furnace structure, the partially expanded honeycomb core is positioned as a cold surface in close proximity to a piece of metal stock of the interface material. When the electron beam is directed onto the source of interface material, the material is evaporated and condenses upon the closest face of the honeycomb core. Then, after the cell edges on both of the open faces of the core have been coated and the core removed from the furnace, the core is expanded in a conventional manner. In positioning the honeycomb core in the furnace the surfaces of the cell edges that are to be coated are positioned substantially transversely to the moving direction of the evaporated interface material and the coil cell side walls substantially parallel to the direction of evaporated material. Since in the apparatus described above the source of evaporating interface material is very nearly a point source and thus it is difficult to maintain all the core cell side walls parallel to the direction of the evaporating material, the honeycomb core is only partially expanded for condensation of the interface material thereon. In this manner the interface material may easily be applied evenly to substantially only the honeycomb core cell edges where a bond is to be made, and the thickness of the layer of interface material may be very accurately controlled even to very thin layers.

As a further aspect of the present invention, several different interface materials are successively condensed upon the edges of the honeycomb core prior to application of temperature and pressure for producing a bond between the honeycomb core and surface sheets. By fabricating a sandwich structure in this manner, interface materials can be utilized at the joint which have better metallurgical compatibility and optimum diffusion characteristics with the adjacent metal. Addtionally, a joint with optimum response to changes in environmental temperature conditions can be provided by these several interface metals so that a graded coefficient of expansion exists at the joint in those cases where the core and surface sheets have different coefficients of expansion or where a temperature gradient is likely to exist at the bond between the surface sheets and core components.

Other objects of the present invention will become apparent upon reading the following specification and referring to the accompanying drawings in which similar characters of reference represent corresponding parts in each of the several views.

In the drawing:

FIG. 1 is a plan view of a partially expanded honeycomb core onto which an interface material is condensed according to the present invention;

FIG. 2 is a side cross-sectional view of an electron beam furnace for vacuum evaporation deposition of an interface material onto a partially expanded honeycomb core;

FIG. 3 is a side sectional view of a portion of a honeycomb core to which an interface material has been applied;

FIG. 4 is an elevational sectional view of the means by which the sandwich structure is bonded;

FIG. 5 is a side sectional view of a portion of a completed honeycomb sandwich structure according to the present invention; and FIG. 5A is a side sectional view of a portion of another completed honeycomb sandwich structure according to the present invention.

Referring now to FIG. 1, there is shown an elevational view of one open surface of a partially expanded honeycomb core component 10 looking in the direction of the axis of the columnar cells. The core is illustrated as greatly expanded from its unexpanded form in order to show the cell edges onto which interface material is to be applied.

It has been discovered that the honeycomb core component 10 should be at least partially expanded to ensure bonding between each of the honeycomb core cell edges and the surface sheet in the final sandwich structure. If the interface material is condensed onto an unexpanded honeycomb core in which opposite walls of the honeycomb cells are in substantial contact, it has been found that, upon expansion of the honeycomb material, portions of an interface material that is of any appreciable thickness will pull apart onto opposite wall edges or will flake off thereby preventing complete bonding of all cell edges and the surface sheet. On the other hand, the greater the honeycomb core is expanded, the further the interface material will penetrate into the cells where the interface material serves no useful purpose and only adds to the weight of the composite structure. It has been discovered that if the honeycomb core is expanded until opposing cell walls are just out of contact with one another, the interface material can be condensed onto the cell edges to produce a bond at every edge without unduly adding to the weight of the structure.

This partially expanded honeycomb core 10 is placed in an electron beam furnace chamber A (see FIG. 2) in a central aperture of a rotatable mounting platform B in close proximity to one end of a piece of metal stock 11 of the interface material. The chamber A is evacuated by means of a pump C and the metal stock 11 is fed into the chamber A through a vacuum seal 12. Inside the chamber A a shield D surrounds the core 10 and stock 11. The shield is heated by, for example, an electric current to a high temperature and the core 10 is heated by, for example, an electric current to a temperature below that of the shield. While the core 10 is the "coldest" surface within the furnace during evaporation of interface material it is sufficiently hot to insure a good bond with the interface material condensed thereon. An electron beam E is directed from an electron gun G through an aperture in the shield D onto the stock 11 to heat the stock to evaporation temperature. As the stock evaporates it condenses on the closest cold surface which is the open face of the honeycomb core 10. With the core only partially expanded and positioned with the surface to be coated closest to the interface metal stock 11 and aligned substantially transversely to the direction of the evaporated material, the interface material condenses on substantially only the cell edges without condensing to any appreciable extent on the core cell side walls. After the core 10 has been coated on one open surface with interface material the platform B is rotated, and the core 10 coated on its other open surface. The thickness of the interface material layer applied to the honeycomb core is easily controlled by controling the electron beam current and the length of time that the interface material is permitted to condense onto the honeycomb core.

While the invention has been described with reference to an electron beam furnace, other types of metal evaporating apparatus can be utilized. For example, the interface material stock can be heated to evaporation temperature by resistance heating, or a laser beam could be focused thereon.

Also, while the step of vacuum evaporating the interface material has been described with respect to a single piece of partially expanded honeycomb core, it is obvious that a continuous length of partially expanded core material can be passed through the furnace by passing the core length through continuously pumped partially evacuated chambers on either side of the furnace chamber A with an evaporating stock of interface material on each of two sides of the core in the chamber A to coat both sides of the core simultaneously. With this arangement, the thickness of the condensed interface material is easily controlled by regulating the running speed of the length of core material.

After the partially expanded honeycomb core has been coated on both sides with the interface material, it is expanded in a conventional manner such as by applying tension to opposite ends of the core 10. A side sectional view of a portion of an expanded core component 15 with an interface metal layer 16 deposited thereon is shown in FIG. 3. This layered expanded core component 15 is sandwiched between two surface sheet components 17 and 18, and the components are bonded together under proper conditions of temperature and pressure in a chamber L described in detail below with reference to FIG. 4.

Referring now to FIG. 4, within the chamber L, the upper and lower outer surface sheet components 17 and 18 sandwich the columnar cells of the expanded honeycomb core component 15, and all the components are aligned within upper and lower flat pressure platens M and N. The surfaces of the upper and lower pressure platens M and N are electrically insulated from outer surface sheets 17 and 18 by hard spacers 19 and 20 of, for example, aluminum oxide or like material. The hard spacers 19 and 20 and faces of the platens M and N have a surface which is contoured to the shape of surface sheets 17 and 18 so that the compressional force will be easily distributed over the whole surface of the area.

The chamber A is evacuated by pump P to create a contaminant-free vacuum atmosphere, and the sandwich is then subjected to heat by means of, for example, an A.C. electrical power source O connected to the sandwich by leads P and to compressional force applied by the platens M and N and indicated by the force arrows F.

Obviously, the honeycomb sandwich can be heated by other techniques such as a separate heater, and the force arrows F are intended to represent any controllable mechanical power means which is commonly in use. Alternatively, the force may be applied by gas pressure.

Referring now to FIG. 5 showing a completed sandwich, where it is possible to achieve close tolerance in the fabrication of the sandwich core component, the layer of interface metal condensed on the cell edges is sufficiently thin so that upon application of heat and pressure the interface metal 16' migrates into the juxtaposed portions of the core component 15' and the sheet component 17' to provide at the joint a continuous solid solution of the metals of the components rich with the interface metal and without any distinct region of pure interface metal.

Referring now to FIG. 5A, wherein the fabrication of the sandwich core, such as when refractory metals are used, it is impossible to achieve tolerances that provide complete contact between the sandwich components under bonding temperature and pressure conditions, the layer of interface metal 16 is condensed on the cell edges to a thickness at least as great as the tolerance of the surface of the core. Then, the temperature conditions during the bonding process are selected so as to cause the interface metal to yield at the elevated regions of the core surface so that contact and thus a good bond are achieved between the surface sheet and all adjacent cell edges. As illustrated in FIG. 5A, the layer 16" of interface material has yielded at the raised portions 15a of the surface of the honeycomb core component 15" under the bonding conditions of elevated temperature and pressure. Thus, a good bond is attained between the core component 15" and the surface sheet component 17" even though the surface of the honeycomb core 15" did not initially exactly conform to the inner face of the surface sheet component 17". There may be certain edges of the core that are bonded to the surface sheet by a bond that is a continuous solid solution that does not contain any region of pure interface material.

While the invention has been described with respect to fabrication of a honeycomb sandwich having two surface outer sheets and a honeycomb core, the invention is also applicable to a structure where a surface sheet is applied to only one open surface of a honeycomb core.

As an additional feature of the present invention, honeycomb sandwich structures are made by successively condensing several different interface materials on the honeycomb core for producing a more desirable bond with the surface sheets. For example, a first metal is condensed on the edges of the honeycomb core by evaporation and then one or more additional interface metals are coated on top of the previously applied interface metal.

According to this aspect of the present invention, by properly selecting the several interface metals and properly arranging their order on the edges of the honeycomb core, a number of desirable features can be achieved. First of all, a better metallurgical compatability between the interface material which contacts the surface sheets during the bonding process may be provided. Additionally, interface metals having orderly graded coefficients of expansion may be utilized to produce a bond which better withstands changes in environment temperature conditions. Furthermore, the interface material may be so selected as to position at the bond adjacent the sandwich components interface metal having optimum diffusion characteristics with the metal components in contact therewith.

By way of example, nickel can be first condensed by evaporation on the edges of a stainless steel honeycomb core and then a very light layer of chromium condensed on top of the layer of nickel. This structure will give better metallurgical compatibility and diffusion characteristics between the stainless steel and a molybdenum surface sheet when the honeycomb core is pressed against the surface sheet under high temperature in order to form a diffusion bond.

Three examples of the method by which columbium, molybdenum and stainless steel honeycomb and surface sheets were bonded together with a titanium interface material are as follows:

|  | Example 1 | Example 2 | Example 3 |
|---|---|---|---|
|  | Material | | |
|  | Columbium (D-36) (in.) | Molybdenum (TZM) (in.) | Stainless Steel (PH 15, 7 Mo) (in.) |
| Honeycomb Core: | | | |
| Gauge | .002 | .002 | .0015 |
| Core Thickness | 3/8 | 3/8 | 1 |
| Expanded Length | 1 3/8 | 1 | 1 |
| Expanded Width | 1 3/8 | 1 | 1 |
| Expanded Cell Size | 3/16 | 3/16 | 3/16 |
| Surface Sheets: Gauge | .010 | .002 | .010 |

Size—about 1/8″ larger than expanded core.

|  | Material | | |
|---|---|---|---|
|  | Titanium (Pure) (in.) | Titanium (Pure) (in.) | Titanium (Pure) (in.) |
| Interface Material: | | | |
| Thickness, 1st core surface | .0003 | .0003 | .0003 |
| Thickness, 2nd core surface | .0007 | .0007 | .0007 |

When sufficient bonding had occurred between the interface material and both the surface sheets and core components, the compressional force was removed and the chamber air pressure returned to normal. The resultant sandwich had a good visual appearance; all the cell edges were bonded to the surface sheets; and the cell walls were not crushed.

Although the foregoing invention has been described in some detail by way of illustration and example for purposes of clarity of understanding, it is understood that certain changes and modifications may be practiced within the spirit of the invention as limited only by the scope of the appended claims.

A large sheet of the honeycomb core in unexpanded form in which opposite cell walls were in contact was expanded to twice its initial width so that the opposing cell walls were out of contact. This partially expanded core was placed in an electron beam furnace and heated to approximately 1,200° F. in an atmosphere of about $10^{-6}$–$10^{-5}$ Torr. The electron beam was directed upon the interface material stock to heat the stock to evaporation temperature whereupon the evaporated interface material condensed substantially solely on the exposed cell edge faces and with no significant amount of metal being deposited on the sides of the cells. The core was first coated on one open surface thereof with a .0003″ layer of titanium and then on the opposite open surface thereof with a .0007″ layer of titanium.

The layered, partially expanded honeycomb core was then expanded by applying tension at the ends of the core sheet, and a piece of honeycomb of the desired size was cut. The honeycomb core was then sandwiched between two surface sheets and all placed between the pressure platens in the bonding chamber L. The bonding chamber was then air-sealed and the ambient pressure reduced to the order of $5 \times 10^{-4}$ Torr.

When the chamber was sufficiently evacuated, an electric current was run through the sandwich until the temperature of the sandwich in the cases of columbium and stainless steel reached 1,800° F. and in the case of molybdenum, reached 2,000° F. The current was regulated to maintain the temperature constant.

With the sandwich at these elevated temperatures noted above, a pressure of 20 p.s.i. in the case of stainless steel, 45 p.s.i. in the case of columbium and 75 p.s.i. in the case of molybdenum was applied. This pressure ensured contact between the core and surface sheets and was continued in each case for a period of ten minutes.

We claim:

1. A method of forming a composite structure having a metal honeycomb core component enclosed within two metal outer surface sheet components comprising the steps of: depositing on the edges of the core component cell walls an interface metal dissimilar to the metal of either the core or surface sheet components and having a yield strength at elevated temperatures lower than that of said core component and of a thickness at least as great as the tolerance of the surface of the core component; placing said honeycomb core component between said two outer surface sheet components in contacting relationship; elevating the temperature of the components; applying to the surface of the assembled components compressional force less than that which will permanently deform the core component; and applying heat and pressure to compress said interface metal at elevated regions of the core surface and to join the core and the surface sheet components along the entire interface threebetween.

2. A method of forming a composite structure having a metal honeycomb core component covered on at least one of the open faces thereof with a metal outer surface sheet component comprising the steps of: partially expanding the cells of an unexpanded honeycomb core at least to such extent that opposing cell walls in each cellular column of the honeycomb core are out of contact with one another whereby metal will be deposited by condensation substantially only on the edges of the honeycomb core; condensing a layer of metal dissimilar to the metal of either the core or surface sheet components on the edges of the partially expanded honeycomb core cell walls at one open face thereof; expanding said partially expanded honeycomb core to provide a honeycomb core component with open cellular columns therein; placing the layered face of said honeycomb core component in contacting relationship with said surface sheet component; elevating the temperature of the components; applying to the surface of the assembled components compressional force less than that which will permanently deform the core component; and applying heat and pressure to join the core component and the surface sheet component along the entire interface therebetween.

3. The method of claim 2 wherein the step of condensing the layer of dissimilar metal on said edges of the partially expanded core includes the steps of: creating a contaminant-free atmosphere around the partially expanded core and evaporating the dissimilar metal in said atmosphere in close proximity to said edges of said partially expanded core to cause said dissimilar metal to condense on said edges of said partially expanded core.

4. A method of forming a composite structure having a metal honeycomb core component enclosed within two metal outer surface sheet components comprising the steps of: partially expanding the cells of an unexpanded honeycomb core at least to such extent that opposing cell walls in each cellular column of the honeycomb core are out of contact with one another whereby metal will be deposited by condensation substantially only on the edges of the honeycomb core; depositing on the edges of the partially expanded core cell walls a dissimilar interface metal having a melting point below that of said core and surface sheet components and a yield strength at elevated temperatures lower than that of said core component and of a thickness at least as great as the tolerance of the variation in the surface of the core component; expanding said partially expanded honeycomb core to provide a honeycomb core component with open cellular columns therein; placing said honeycomb core component between said two outer surface sheet components in contacting relationship; creating a contaminant-free atmosphere around the sandwich; elevating the temperature of the components; applying compressional force to the surface of the components less than that which will permanently deform the core component; and continuously applying heat and pressure to compress said interface metal at elevated regions of the core surface and to join the core and surface sheet components along the entire interface therebetween.

5. A method of forming a composite structure having a metal honeycomb core component covered on at least one of the open faces thereof with a metal outer surface sheet component comprising the steps of: partially expanding the cells of an unexpanded honeycomb core at least to such extent that opposing cell walls in each cellular column of the honeycomb core are out of contact with one another whereby metal will be deposited by condensation substantially only on the edges of the honeycomb core; condensing a layer of a first metal dissimilar to the metal of either the core or the surface sheet components on the edges of the honeycomb core component cell walls at one open face thereof; condensing a layer of a second metal dissimilar to the first condensed metal on the edges of the honeycomb core component cell walls on top of said first metal; placing the layered surface of said honeycomb core component in contacting relationship with said surface sheet component; elevating the temperature of the components; applying to the surface of the assembled components compressional force less than that which will permanently deform the core component; and applying heat and pressure to join the core component and the surface sheet component along the entire interface therebetween.

References Cited
UNITED STATES PATENTS

| | | | |
|---|---|---|---|
| 3,030,703 | 4/1962 | Wirsing | 29—471.1 |
| 3,123,908 | 3/1964 | Boller | 29—471.1 |
| 3,011,602 | 12/1961 | Ensrud et al. | 189—34 |
| 3,072,225 | 1/1963 | Cremer et al. | 189—34 |
| 3,009,241 | 11/1961 | Giovannucci | 29—455 |
| 3,055,098 | 9/1962 | Bratowski | 29—492 |
| 3,088,192 | 5/1963 | Turner | 29—497.5 X |
| 3,091,845 | 6/1963 | Herman et al. | 29—455 X |
| 3,107,422 | 10/1963 | Eckermann | 29—502 X |

FOREIGN PATENTS

| | | |
|---|---|---|
| 868,089 | 5/1961 | Great Britain. |

JOHN F. CAMPBELL, *Primary Examiner.*